(12) United States Patent
Iseli

(10) Patent No.: US 6,543,433 B2
(45) Date of Patent: Apr. 8, 2003

(54) METHOD AND A DEVICE FOR DRESSING A SAW BLADE

(75) Inventor: Benno Iseli, Schötz (CH)

(73) Assignee: Iseli & Co. AG Maschinenfabrik, Schötz (CH)

( * ) Notice: Subject to any disclaimer, the term of this patent is extended or adjusted under 35 U.S.C. 154(b) by 0 days.

(21) Appl. No.: 09/843,157

(22) Filed: Apr. 26, 2001

(65) Prior Publication Data

US 2002/0005193 A1 Jan. 17, 2002

(30) Foreign Application Priority Data

Apr. 26, 2000 (CH) .............................................. 0816/00
May 10, 2000 (CH) .............................................. 0910/00

(51) Int. Cl.[7] ............................................ B23D 63/18
(52) U.S. Cl. .............................. 125/2; 125/12; 76/27.5; 76/25.01
(58) Field of Search .......................... 125/2, 12; 76/27, 76/50, 25.1; 72/179

(56) References Cited

U.S. PATENT DOCUMENTS

| | | | | |
|---|---|---|---|---|
| 2,393,300 A | * | 1/1946 | Denton ........................ | 76/25.1 |
| 4,852,430 A | * | 8/1989 | Oppliger et al. .............. | 72/179 |
| 5,016,497 A | * | 5/1991 | Sundstrom .................. | 409/173 |
| 5,522,283 A | * | 6/1996 | Brown ........................ | 76/25.1 |
| 5,826,465 A | * | 10/1998 | Iseli ............................. | 76/112 |
| 5,931,057 A | * | 8/1999 | Beck et al. ................... | 76/25.1 |
| RE36,409 E | * | 11/1999 | Brown .......................... | 76/27 |

FOREIGN PATENT DOCUMENTS

| | | |
|---|---|---|
| DE | 42 14 784 | 11/1992 |
| WO | 97/46335 | 6/1997 |

* cited by examiner

Primary Examiner—Joseph J. Hail, III
Assistant Examiner—Anthony Ojini
(74) Attorney, Agent, or Firm—Pauley Petersen Kinne & Erickson

(57) ABSTRACT

A dressing center with a roller unit wherein a saw blade is smoothed. The saw blade is led centrically to an ideal plane between corresponding roller pairs. Each roller pair has a roller with a convex running surface and a roller with a concave running surface. The upper rollers are mounted in corresponding bearing blocks. The bearing blocks have threaded sleeves into which the threaded spindles engage. The threaded spindles are driven by stepper motors. The stepper motors are activated as a function of measured unevennesses. Movement of the upper rollers is achieved as a distance proportionally to the measured unevennesses. With a distance-proportional correction, the smoothing is practically achieved in one operating cycle, directly to a desired final measure. The continuously bearing roller pairs result in a method that functions with an extremely low noise level.

12 Claims, 3 Drawing Sheets

METHOD AND A DEVICE FOR DRESSING A SAW BLADE

BACKGROUND OF THE INVENTION

1. Field of the Invention

This invention relates to a method and apparatus for dressing a saw blade, in particular an endless belt-saw blade wherein irregularities in surface evenness of the blade are measured.

2. Description of Related Art

The dressing of belt-saw blades usually includes three different tasks. So that a belt-saw blade during its guiding is loaded as uniformly as possible and no extension stresses occur, which may lead to hair-fracture formations or to an untrue sawing of the belt-saw blade, the belt-saw blade on a rear side must be slightly longer than on the tooth side. This is required because the tooth side is exposed to cutting forces which at this side lead to a greater extension than on the rear side. For uniform running it is also necessary to form a so-called tension profile into the belt-saw blade. This tension profile includes an embossing transverse to a longitudinal direction of the belt-saw blade and extends over an entire length of the belt-saw blade. It important for the belt-saw blade to have no dents or bulges.

For eliminating dents and bulges, there is a device which in technical language is described as a dressing center. Such a device uses measuring stations of different types. For measuring the tension profile a measuring station is arranged in a region where the belt-saw blade blends from an arcuate deflection into the level running. This measurement is a measuring line transverse to a movement direction of the belt-saw blade. A second measuring for determining bulges or dents occurs at a measuring point below which the moved belt-saw blade is led through. From a fictive, ideal blade plane, downward deformations, thus dents, or upward deformations, the so-called bulges, are measured. A last measuring station is for the path measurement. Because the tension profile measuring station and the bulge and dent measuring station are not arranged directly at the location of the correction deformation, one must continuously measure when the corresponding deformation is located at the corresponding processing unit. This measuring station includes a roller scanning. The measurements of the deformations may be accomplished optically or with electronic sensors. The corresponding measuring data are delivered to a computer which as a function of variables activates the corresponding machining units.

In this invention, one is interested in the machining unit which is suitable for smoothing bulges or dents. Because the corresponding machining is accomplished using various roller pairs, the corresponding processing unit is also called the roller unit or planing unit.

Such planing units include two pairs of rollers standing vertically over one another, wherein the roller pair which corrects dents has a roller with a convex cross section profile below the belt-saw blade to be corrected and above the belt-saw blade to be dressed has a roller with a concave cross section profile. For correction of bulges these rollers are accordingly arranged in reverse. In this case below the belt-saw blade there is arranged a roller with a concave cross section profile and above the belt-saw blade to be dressed there is arranged a roller with a convex cross section profile. Devices of this type are known on the market in the most varied of embodiment forms, for example as taught by German Patent Reference DE-A-42 14 784 or PCT International Application WO 97/46335.

Before dressing centers appeared on the market, or also today in small businesses, belt-saw blades were and are dressed manually by highly paid expert workers that shaped the belt-saw blades with a hammer. The dressing centers today function very similarly to the previously mentioned experts which are referred to as "saw blade doctors". Hydraulic units move two rollers of the roller pairs up and down. Because the belt-saw blade to be dressed is continuously advanced, the rollers must traverse up and down, instantaneously, which causes a correspondingly high emission of noise. The rollers are fed as a function of the measured unevennesses. Simultaneously, the advance is essentially controlled so that pressure is applied proportional to deformation. Because the hydraulic advance depends on many factors such as temperature, viscosity and mechanical tolerances, and because the kinetic energy of the roller movement has an effect, the belt-saw blade is planed in a type of approximation in several repeated cycles. In other words, for each passage of the blade a linear path is measured out and the correction is accomplished. The entire machining unit is displaced relative to the saw blade by a given amount and the correction again takes place. With the devices known today this process must be effected several times over the whole saw blade width, resulting in many passages. Accordingly, the dressing centers known today are very time inefficient and are also very noisy. The precision of the belt-saw blades planed on known dressing centers is practically directly dependent on the dressing time invested therein.

SUMMARY OF THE INVENTION

It is one object of the this invention to provide a working method which alleviates the previously mentioned disadvantages.

It is another object of this invention to provide a device which functions according to the new method.

A method and device, each which fulfils the above mentioned objects is described in the claims and the subsequent description.

BRIEF DESCRIPTION OF THE DRAWINGS

The drawings show a device according to this invention which is better understood when taken in view of the specification, and its operation method are explained, wherein.

DESCRIPTION OF PREFERRED EMBODIMENTS

Figure 1:
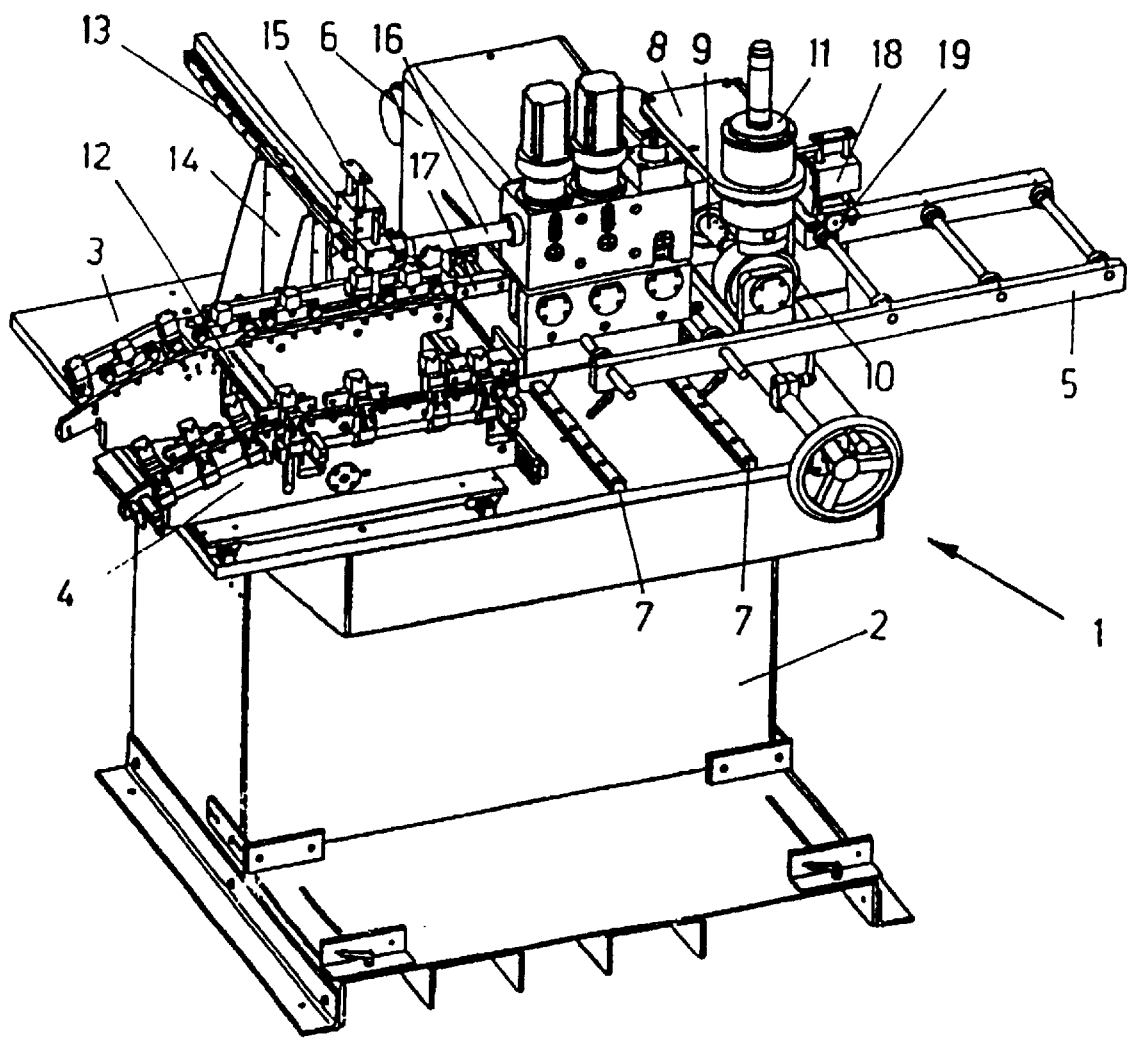
FIG. 1 shows a perspective view of a dressing center without a clamped belt-saw blade.
Figure 2:
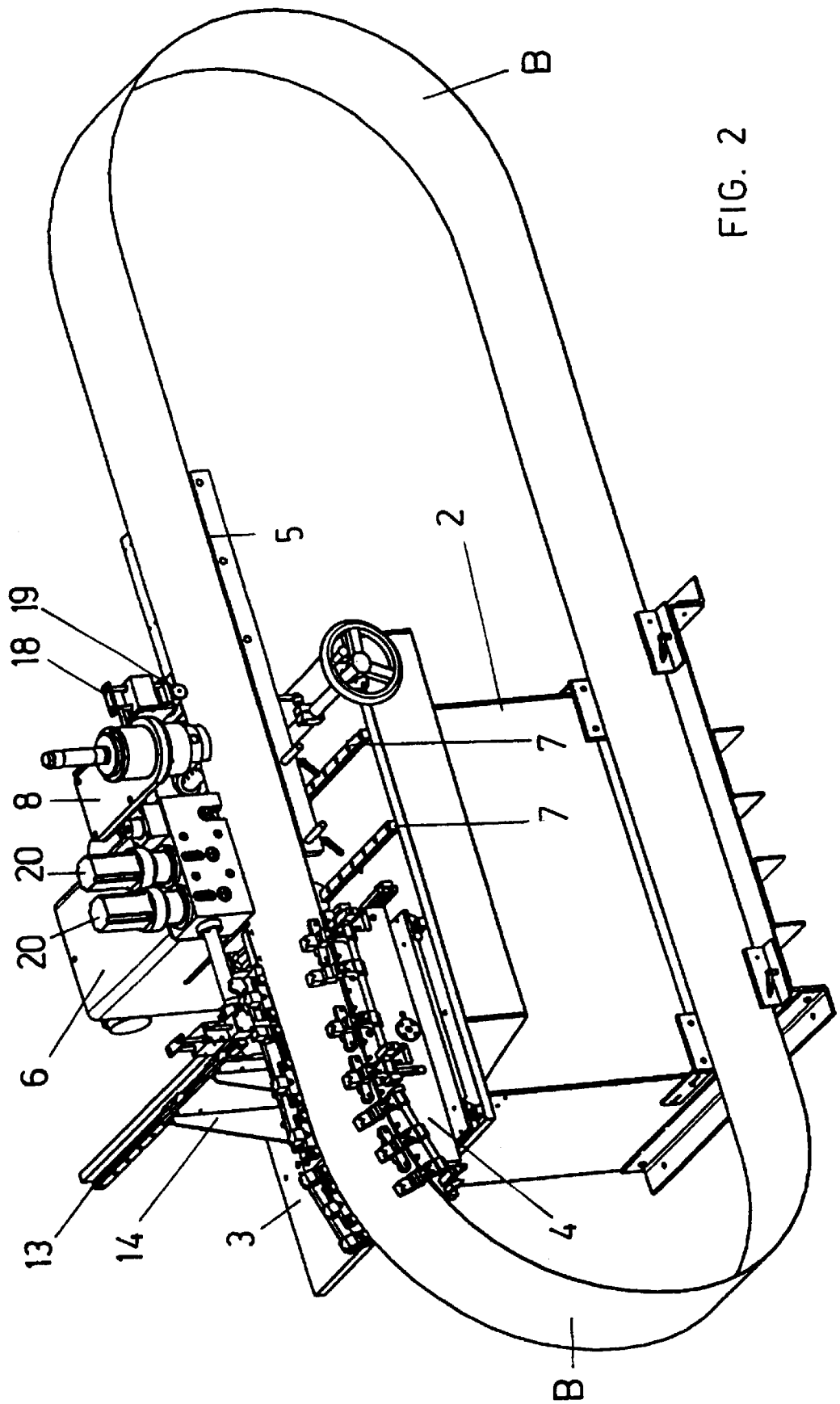
FIG. 2 shows a perspective view of the same device as shown in FIG. 1 but with a clamped belt-saw blade.

The shown embodiments and the subsequent description of the method refer to the dressing of belt-saw blades. The methods and devices according to this invention may, with slight adaptations, also be applied to circular saw blades. Accordingly, the claims refer to a saw blade, while the specification refers to a belt-saw blade which is one example of a saw blade.

The dressing center 1 is shown in its entirety. This stands on a chassis construction 2 on which rests a table 3. The belt-saw blade to be dressed is guided via an introduction path 4 and a subsequent belt guide 5. Between the introduction path 4 and the belt guide 5 is arranged a roller unit 6. The roller unit 6 is guided on rails 7 which permit a displacement of the roller unit 6 perpendicular to the movement direction of the belt-saw blade to be dressed and parallel to its surface. In the movement direction of the belt-saw blade to the roller unit 6 a drive unit 8 is connected in series. This drive unit 8 comprises a driven drive shaft 9 with a drive roller 10 on which the belt-saw blade rests, while from above there rests a non-visible counter-pressing roller, with a contact pressure controlled by a pressing unit 11.

In the region of the introduction path 4 the belt-saw blade to be dressed is preferably led in a clothoidal curve from a circumferential radius into a straight path. In the region of the transition from the arcuate belt guiding into the straight belt guiding is arranged a measuring station 12 in the form of a measuring beam with which the embossing of the belt-saw blade is measured. On a pivotable arm 13 which in the pivoted-away conditions lies on a support 14 there is arranged a second measuring station 15 for measuring unevennesses. The pivot arm 13 is fastened on a pivot pin 16 which itself in turn is rigidly arranged on the roller unit 6. Thus the second measuring station 15 displaces by the same amount as the roller unit 6 is displaced on the rails 7. The pivotable arrangement of the second measuring station 15 permits an improved introduction of the belt-saw blade to be dressed without at the same time damage to the sensor occurring at the second measuring station. A probe 17 monitors a flush resting of the back of the belt-saw blade to be dressed. Finally, in the movement direction of the belt-saw blade to be dressed at the rearmost, is arranged a path distance measuring station 18 which with a scanning roller 19 rests on the belt-saw blade to be dressed.

Above on the mentioned roller unit 6 over the two roller pairs yet to be described there is in each case arranged a stepper motor 20. The two stepper motors 20 are activated as a function of the measured unevennesses. These unevennesses are deduced by way of the second measuring station 15. For this the pivot arm 13 must be pivoted by about 180°. The second measuring station 15 measures the unevennesses with sensors which are accordingly suitable for this purpose. The sensors may be optical or piezo-electrical sensors, and any other suitable sensor. The exit signals of all measuring stations reach a computer which may be part of a dressing center, or also an external computing unit may be supplied with data. The computing unit stores and processes this data and thus controls all drive units of the dressing center. The two stepper motors 20, the drive unit 8 and a roller pair serve the shaping of the embossing of the belt-saw blade.

Instead of the stepper motors 20, hydraulic units or servo-motors can be used to accomplish movement.

Figure 3:
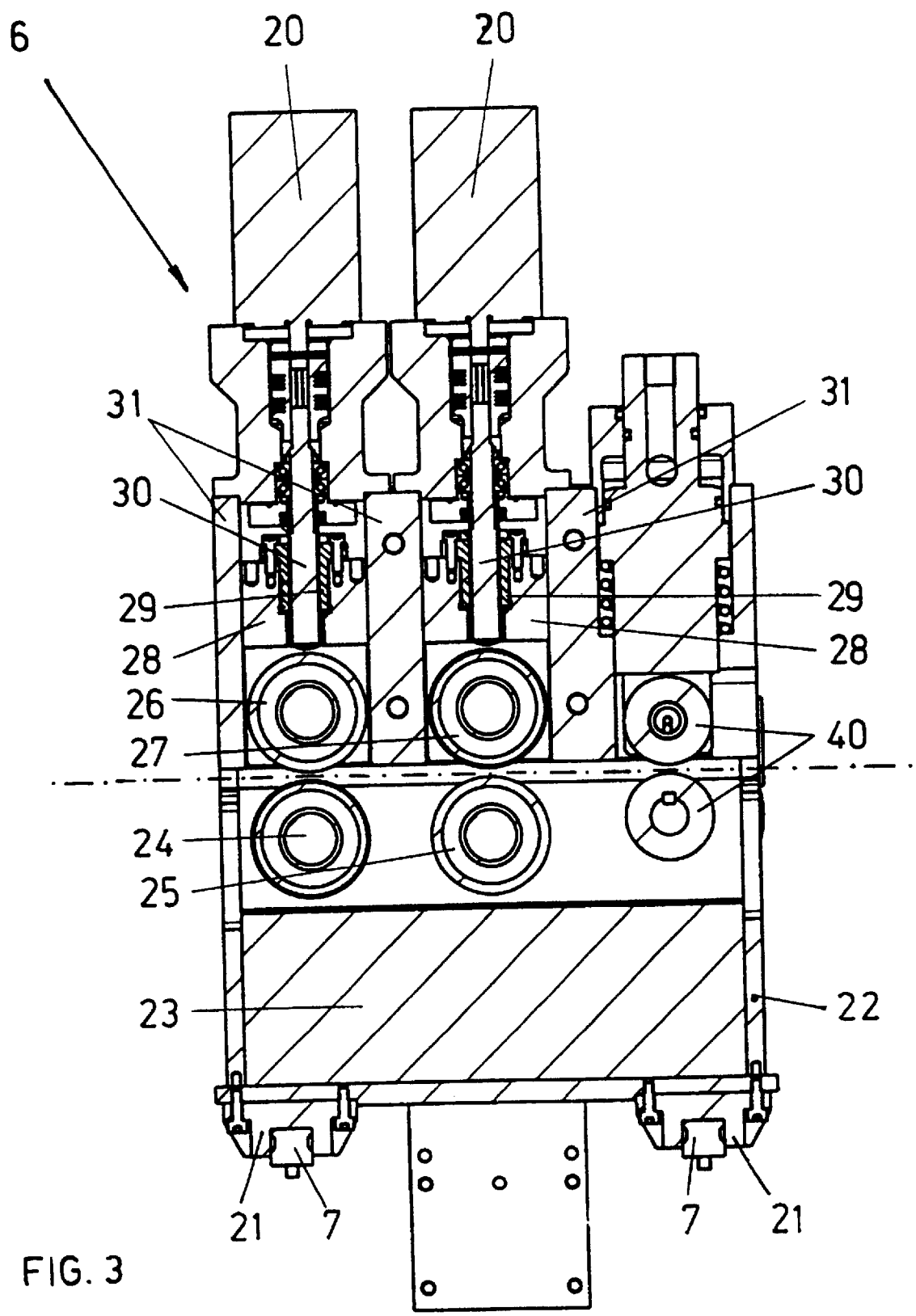
FIG. 3 shows a vertical section taken through a roller unit, according to one embodiment of this invention.

FIG. 3 shows a vertical section taken through the roller unit 6 parallel to the movement direction of the belt-saw blade to be dressed. The entire unit is displaceably arranged on the already previously described rails 7, using sliding blocks 21 which are connected to the housing 22 of the unit 6. Within the housing 22 there is arranged a solid subconstruction 23 in which are mounted two rollers 24 and 25 running flush behind one another in the movement direction of the belt-saw blade to be dressed. Above the two rollers are arranged two upper rollers 26, 27. Thus there are two roller pairs 24, 26 and 25, 27. The pivots of one roller pair run parallel, vertically over one another. The pivots of the flying rollers 26, 27 are mounted in bearing blocks 28. In the bearing blocks 28 there are admitted threaded sleeves 29.

The threaded sleeves 29 are held in the bearing blocks 28 with screws. In each threaded sleeve 29 there engages a fitting thread spindle 30 which is in each case driven by one of the two stepper motors 20.

The previously mentioned control emits suitable control signals to the two stepper motors 20 which accordingly rotate the threaded spindles 30 by a certain amount. As a result, the bearing blocks 28 are displaced upwards or downwards. Thus the two upper rollers 26, 27 move in the direction of their counter-rollers 24, 25. The first roller pair 24, 26 smooths the unevennesses which project downwards with respect to the ideal belt plane I, and the second roller pair 25, 27 smooths unevennesses which project upwards with regard to the ideal belt plane I. Accordingly with the first roller pair the lower roller has a convex running plane, and the upper roller 26 has a concave running surface. In the second roller pair 25, 27 the arrangement is exactly the reverse. Here the lower roller 25 has a concave running surface while the corresponding upper roller 27 has a convex running surface.

The two bearing blocks 28 are led on all sides through bearing cheeks 31. The guiding thus corresponds to a piston in a cylinder.

Following the two roller pairs 24, 26 and 25, 27, for smoothing purposes, there is a further roller pair 40 with which the lower roller is rigidly mounted and the upper roller is under a spring pressure. The roller pair 40 may either serve the driving of the belt-saw blade to be led through, for which both are drivably coupled as shown, or also as previously described the roller pair may serve for shaping the embossing of the saw blade. In one case the two rollers are equipped with flat running surfaces, in another case the running surfaces of both rollers are embossed.

One main principle of this invention is that the belt-saw blade to be dressed centrally to the ideal plane I is led through the roller unit 6 and simultaneously the rollers practically bear on the belt-saw blade. If a dent comes into the region of the first roller pair 24, 26 then the bearing block with the upper roller 26 mounted therein is moved downwards proportional to the measured depth of the dent. Similarly, in the case that a bulge is located in the region of the second roller pair 25, 27 the corresponding bearing block 28 with the upper roller 27 is moved downwards. Here the movement also occurs proportionally to the measured unevenness. Because the belt-saw blade also has a certain intrinsic elasticity, the corresponding movement of the upper rollers 26, 27 must be a certain measure larger than the effectively measured unevenness. For example, with a dent having a depth of 20 hundredths of a millimeter the upper roller 26 must be moved downwards by, for example, 25 hundredths of a millimeter. The proportionality ratio is a function of the thickness of the belt-saw blade and the material from which the belt-saw blade is manufactured. According to the deviation distance of the surface of the belt-saw blade from the ideal plane I over the course of the unevenness there is a corresponding counter movement of the respective upper rollers 26, 27.

In contrast to known methods, as a result one no longer operates with an approximation but the unevennesses are directly pressed to the desired final measure. Accordingly, trials have shown in the majority with all belt-saw blades a single cycle is sufficient in order to optimally smooth the belt-saw blade. Of course it is also possible to repeat the cycles several times and to carry out the displacement distance of the roller pairs perpendicularly to the movement direction at different distances from the back of the belt-saw.

Because the feed movements from the belt surface occur in a bearing manner and also because the stepper motors 20 react very quickly and operate with low noise levels, no hammer noise occurs with machines of the state of the art.

Although in the shown embodiment one operates with stepper motors, the movement of the bearing blocks 28 or of the upper rollers 26, 27 may also be achieved with a hydraulic advance. Such a solution however requires a volumetric hydraulic oil advance. This is considerably more complicated than the mechanical advance by way of stepper motors, as previously described.

What is claimed is:

1. In a method for dressing a saw blade, including an endless belt-saw blade (B), wherein the saw blade (B) is routed above a table (3) in a movement direction, wherein after measuring an unevenness of the saw blade (B) then the saw blade (B) is guided along a roller unit (6) which is adjustably led perpendicular to the movement direction and parallel to a plane in which the saw blade (B) runs, wherein each of two roller pairs (24, 26; 25, 27) has an upper roller (26, 27) arranged vertically over a lower roller (24, 25) and one pair of the two roller pairs smooths according to a measured unevennesses, and wherein for each of the two roller pairs (24, 26; 25, 27) a portion of the lower roller (24, 25) is fixed and the upper roller (26,27) is movably guided, an improvement comprising: moving the two upper rollers (26, 27) directly proportional to a signal corresponding to the measured unevennesses which is a deviation from an ideal plane (I) of the saw blade (B), and in regions of the saw blade (B) without the unevenness the upper roller (26, 27) and the lower roller (24, 25) of each of the roller pairs (24, 26; 25,27) simultaneously bearing on the saw blade (B).

2. In the method according to claim 1, wherein an advance path (18) of the saw blade (B) to be dressed is continuously measured.

3. In the method according to claim 2, wherein the measured unevennesses deviating downwards and upward from the ideal blade plane (I) are measured and are converted into corresponding control signals for activating an advance unit (20) for each of the roller pairs (24, 26; 25, 27), wherein a first roller pair of the roller pairs (24, 26; 25, 27) with a first deviation from the ideal plane (I) downwards and a second roller pair of the roller pairs (24, 26; 25, 27) with a second deviation from the ideal plane (I) upwards are moved relative to one another by a proportional path distance as soon as the saw blade (B) is moved by a corresponding path distance from a measuring location (15) up to a corresponding roller pair of the roller pairs (24, 26; 25, 27) to be activated.

4. In the method according to claim 1, wherein a distance measurement of an advance path (18) of the saw blade (B) is taken in the movement direction after the roller unit (6).

5. In the method according to claim 1, wherein the measured unevennesses (15) is taken along a line parallel to one of a saw blade back and a saw blade periphery until an entire saw blade length is measured, and the roller unit (6) is displaced by a distance perpendicular to the movement direction until an entire saw blade surface is processed and a dressing cycle is completed.

6. In the method according to claim 5, wherein the dressing cycle is only carried out once.

7. In the method according to claim 5, wherein the dressing cycle is carried out a plurality of times.

8. In the method according to claim 7, wherein the distance of displacement of the roller unit (6) is maintained constant throughout all dressing cycles.

9. In the method according to claim 7, wherein the distance of displacement of the roller unit (6) changes with each successive dressing cycle.

10. In the method according to claim 1, wherein a movement distance of the upper rollers (26, 27) is greater than the measured unevenness (15) of the saw blade (B) from the ideal plane (I).

11. In the method according to claim 1, further comprising a device including one of a stepper motor and a servo-motor (20) for moving the upper rollers (26, 27) of the roller pairs (24, 26; 25, 27).

12. In the method according to claim 11, wherein both of the upper rollers (26, 27) are pivotably held in a bearing block (28) which is guided in a vertical guide (31), and with a threaded spindle (30) is movable up and down by the one of the stepper motor and the servo-motor (20).

* * * * *